March 29, 1932.  S. S. HIXON  1,851,579
BINOCULAR NOSE GLASSES
Filed Jan. 13, 1931
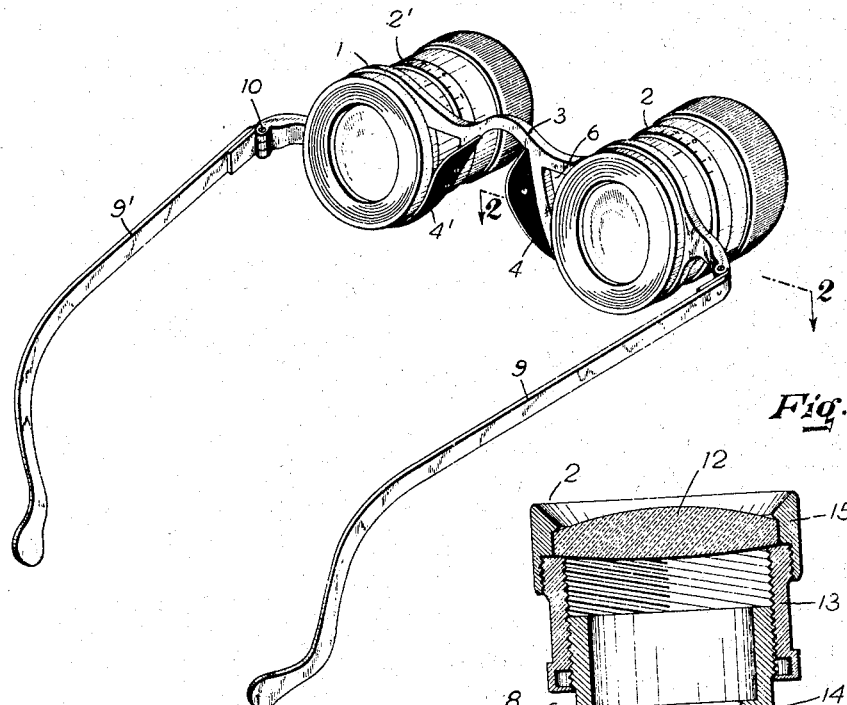
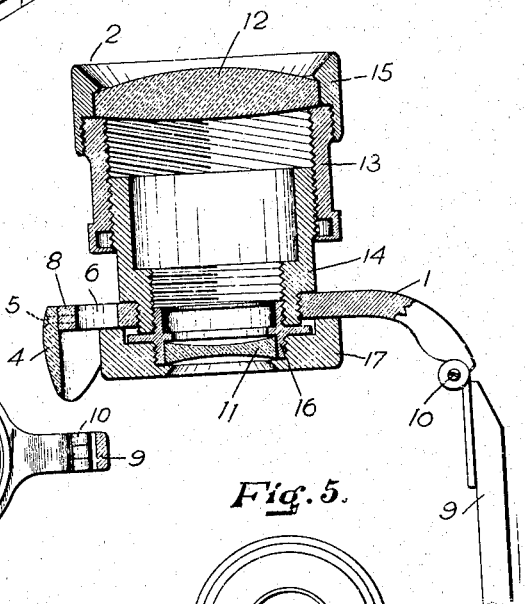
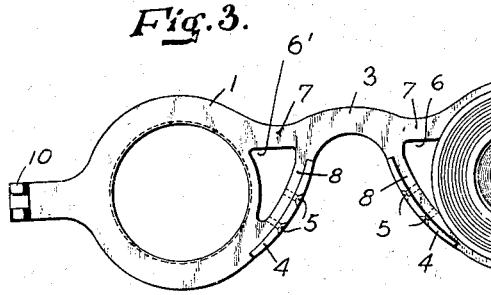
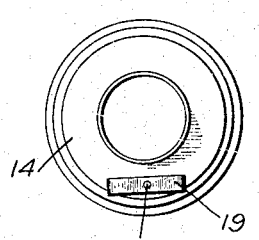
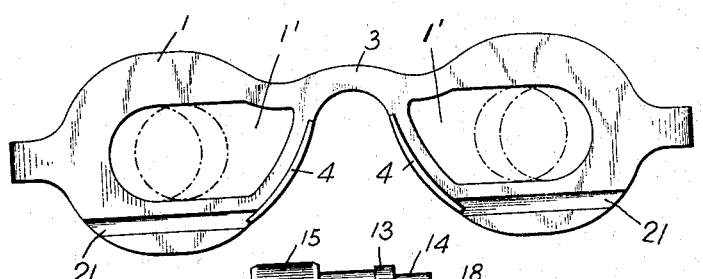
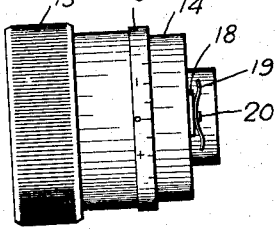
INVENTOR.
SAMUEL S. HIXON,
BY Duell, Dunn & Anderson
ATTORNEYS.

Patented Mar. 29, 1932

1,851,579

UNITED STATES PATENT OFFICE

SAMUEL S. HIXON, OF NEW YORK, N. Y., ASSIGNOR TO SPORTOCULAR CORPORATION, OF NEW YORK, N. Y., A CORPORATION OF NEW YORK

BINOCULAR NOSE GLASSES

Application filed January 13, 1931. Serial No. 508,421.

This invention relates to improvements in binocular glasses and more particularly to that class adapted to be worn as nose glasses and held in position by spectacle bows. Glasses of this type are intended to be worn by persons watching sporting events and other outdoor scenes as well as those in indoor audiences.

The present invention seeks to remedy previous defects and to provide as a unitary structure binocular spectacles which can be correctly adjusted and comfortably worn and which are properly balanced, durable and adapted for economical manufacture.

It is a further object of this invention to provide means by which the binoculars may be adapted for different interpupillary distances without substantial addition to the weight or bulk of the device.

Other objects will be in part obvious and will be in part pointed out hereinafter.

The invention accordingly comprises an article of manufacture possessing the features, properties, and the relation of elements which will be exemplified in the article hereinafter described and the scope of the application of which will be indicated in the claim.

For a fuller understanding of the nature and objects of the invention, reference should be had to the following detailed description taken in connection with the accompanying drawings, in which:

Fig. 1 is a view in perspective of a device embodying my invention;

Fig. 2 is an enlarged sectional view of Fig. 1 on the line 2—2;

Fig. 3 is a view in elevation from the ocular side of the frame and nose pieces showing one of the binoculars in position;

Fig. 4 is a view in elevation from the ocular side of a frame embodying a modification of my invention;

Fig. 5 is a view in elevation of a portion of one of the binoculars adapted for use with the frame of Fig. 4, viewed from the ocular position, and Fig. 6 is a bottom plan view of Fig. 5.

Referring now to the drawings, the numeral 1 represents a rigid integral frame, preferably of metal, in which are a pair of circular openings adapted to receive and support the binocular glasses 2, 2'. The central portion 3 of the frame 1 is constructed with a substantially concave lower edge in order that it may avoid weighing upon, or preferably even touching, the bridge of the nose when the glasses are worn. Such concavity should equal or exceed the convexity of the bridge of a normal nose. The frame is also provided with nose pieces 4, 4' which are adapted to rest on each side of the wearer's nose and support the device in proper position. These nose pieces 4, 4' are substantially broader both in length and in breadth than the thickness of the frame 1, in order that they may distribute the weight of the device over a large surface on each side of the nose. They are preferably made of some material which is a poor conductor of heat, capable of distortion only when warmed, as in boiling water, which then permits the bending of the nose pieces to fit the nose of the wearer. Suitable materials for the nose pieces are cellon, celluloid, pyralin, or other non-metallic substances. The frame 1 is preferably slightly recessed, as shown in Fig. 3 to receive the nose pieces 4, 4' which are rigidly secured to the frame as by means of the screws 5. The frame 1 is preferably provided also with openings 6, 6' located between the center 3 and the binocular glasses 2 and 2'. These openings serve as ventilating means and serve also to lighten the weight of the device without sacrificing its strength or rigidity, since the branches 7 and 8 of the frame 1 engage the rim which holds the binoculars 2, 2' at points spaced far apart. At the outer ends of the frame 1 are mounted the bows 9, 9' which are shaped at their outer ends to accommodate the ears of the wearer. These bows may be connected to the frame by the hinge 10, as shown, or in any other suitable manner. The bows 9, 9' are preferably made of such a material as that described for the nose pieces 4, 4' and for like reasons.

Each of the binoculars 2, 2' consists of an ocular lens 11 and an objective lens 12, fitted within a cylindrical housing. This housing consists of two telescoping cylinders 13 and 14 connected by means for allowing the extension or retraction of the binoculars as, for example, by screw threads in the cylinder 13 engaging with corresponding grooves in cylinder 14 at a sufficient pitch so that by manually turning the cylinder 13, the focal distance between the lenses can be adjusted. The lens 12 is held in place by the collar 15 which is screwed upon the cylinder 13 as shown. The cylinder 14 is provided with a shoulder and with a narrower portion adapted to fit within the circular opening in the frame and may be connected to it by suitable screw threads. Within the cylinder 14 is seated a member 16 which contains the usual diaphragm and which supports the lens 11. A collar 17 is screwed upon the member 16 and serves to keep the lens 11 in place and also to fasten the binocular 2 to the frame 1. Any other type of binocular lens or any other type of adjustment may be used if preferred. There is preferably omitted any connection between the pair of binoculars, for the purpose of avoiding weight and in order to permit the separate adjustment of the lenses to suit a user who has a difference in visual power of his eyes.

In order to adapt the device for use with eyes of different interpupillary distance, the binoculars are placed an average distance apart, such as a distance of 62 millimeters between the optical axes and a large ocular lens, as of about 17.5 millimeters, is chosen.

As a modification of my invention, there is shown in Figs. 4, 5 and 6 a device for varying interpupillary adjustment, if desired, without substantial additional weight. Referring more particularly to these drawings, it will be noted that the frame 1 contains a pair of openings 1' which are greater in horizontal than in vertical dimension. These openings are of such size that the member 16 of one of the binoculars can move a limited distance in a horizontal direction within said opening, no screw threads being provided in this instance between the member 16 and the frame 1. The permitted distance for such horizontal movement is sufficiently great to allow the interpupillary distance of the binoculars to be adjusted to suit all normal users. It is desirable that the ocular lens be held firmly in place after the correct interpupillary adjustment has been made and for this purpose there is provided the collar 17 threaded to the member 16 and adapted to bear against the frame 1 when screwed firmly into place, and also a connection between the frame 1 and the binocular to prevent unintentional rotation or other movement between the two. This connection consists of the rail 18 which projects from the cylinder 14 and carries on a projecting pin 19 the spring member 20. The frame 1 is provided with a groove 21 extending horizontally of the frame and adapted to receive the rail 18 and spring 20 in such manner that when the collar 17 is partly unscrewed, the binocular 2 may be moved horizontally, the rail 18 and spring 19 correspondingly moving in the groove 21 until the desired position is reached, then the tightening of the collar 17 serves to compress the spring 20 and lock the parts into rigid position. The opening 1' used for this purpose may be made, as shown, integral with the ventilating opening or the two openings may be separated by a portion of the frame.

It will thus be seen that by the construction above described, the frame is integral and rigid and need not be bent for the sake of adjusting the device to the user. The nose piece, although adjustable, is likewise rigidly secured to the frame. The entire device, therefore, rests firmly in position when worn and is freed from the vibrations and distortions which would make such a device uncomfortable and would impair the vision of the user. The weight of the device is distributed over a large surface in a position where most comfortably carried, and the entire weight is largely balanced through the fact that the weight of the bows 9, the ocular lenses 11, the collar 17 and associated parts lying inside the frame 1, partly offsets the weight of the objective lenses and the other portions of the binoculars lying outside the frame. The ventilating apertures prevent the discomfort which might result from a solid plate frame without affecting rigidity. Finally, adaptability to different interpupillary distances is obtained without added weight by either of the methods above described.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

Having described my invention, what I claim as new and desire to secure by Letters Patent is:

In a device of the character described, in combination, a frame, a pair of openings therein, a pair of binoculars mounted in said openings, said openings being wider horizontally than vertically, means for moving each binocular horizontally therein to a predetermined point; means for thereafter preventing movement between said binocular and said frame, said locking means including a collar affixed to said binocular and adapted to be tightened against one side of said frame, a spring interposed between the opposite side of said frame and a projection upon a portion of said binocular and a groove in the side of said frame adapted to receive said spring and projection when said binocular is in any one of a plurality of positions relative to said frame.

In testimony whereof I affix my signature.
SAMUEL S. HIXON.